United States Patent
Shroff et al.

(10) Patent No.: US 12,281,131 B2
(45) Date of Patent: Apr. 22, 2025

(54) PROCESS FOR PREPARATION OF THIOPHOSPHORYL CHLORIDE AND ACEPHATE

(71) Applicant: UPL LTD, Mumbai (IN)

(72) Inventors: Rajju Devidas Shroff, Mumbai (IN); Vic Prasad, Mumbai (IN); Amul Manubhai Desai, Mumbai (IN); Gopalrao Atul Wankhade, Mumbai (IN); Lilaram Kamal Kataria, Mumbai (IN); Raj Kumar Tiwari, Mumbai (IN); Raj Kumar Arora, Mumbai (IN)

(73) Assignee: UPL LTD, Mumbai (IN)

( * ) Notice: Subject to any disclaimer, the term of this patent is extended or adjusted under 35 U.S.C. 154(b) by 307 days.

(21) Appl. No.: 17/770,083

(22) PCT Filed: Oct. 13, 2020

(86) PCT No.: PCT/IB2020/059584
§ 371 (c)(1),
(2) Date: Apr. 19, 2022

(87) PCT Pub. No.: WO2021/074775
PCT Pub. Date: Apr. 22, 2021

(65) Prior Publication Data
US 2023/0002424 A1   Jan. 5, 2023

(30) Foreign Application Priority Data
Oct. 19, 2019   (IN) .............................. 201921042520

(51) Int. Cl.
*C07F 9/24* (2006.01)
*C01B 25/14* (2006.01)

(52) U.S. Cl.
CPC ............ *C07F 9/2487* (2013.01); *C01B 25/14* (2013.01); *C01P 2006/80* (2013.01)

(58) Field of Classification Search
CPC ..... C07F 9/2487; C01B 25/14; C01P 2006/80
USPC .......................................................... 558/97
See application file for complete search history.

(56) References Cited

U.S. PATENT DOCUMENTS

| | | | |
|---|---|---|---|
| 2,715,561 A | 8/1955 | Knotz | |
| 2,850,354 A | 9/1958 | Korkmas et al. | |
| 5,464,600 A | 11/1995 | Newallis et al. | |
| 6,251,350 B1 | 6/2001 | Applegate et al. | |

FOREIGN PATENT DOCUMENTS

| | | |
|---|---|---|
| CN | 102603795 A | 7/2012 |
| DE | 1145589 B | 3/1963 |
| DE | 2032832 A1 | 2/1971 |
| GB | 694380 A | 7/1953 |
| JP | 53116295 A | 10/1978 |

OTHER PUBLICATIONS

Yang et al., Improved Manufacturing Synthesis of Phosphorus Sulphochloride, 2011, Asian Journal of Chemistry, vol. 23(5), 2112-2114 (Year: 2011).*
International Search Report and Written Opinion for International Application PCT/IB2020/059584; International Filing Date: Oct. 13, 2020; Date of Mailing: Jan. 25, 2021; 15 pages.

* cited by examiner

*Primary Examiner* — Kristin A Vajda
(74) *Attorney, Agent, or Firm* — CANTOR COLBURN LLP

(57) ABSTRACT

The present invention discloses an improved process for preparation of acephate and intermediates thereof. More particularly, the present invention relates to a process for preparation of thiophosphoryl chloride useful for commercial production of pesticides and pharmaceutically active compounds.

19 Claims, No Drawings

PROCESS FOR PREPARATION OF THIOPHOSPHORYL CHLORIDE AND ACEPHATE

FIELD OF INVENTION

The present invention relates to an improved process for preparation of acephate and intermediates thereof. More particularly, the present invention relates to a process for preparation of thiophosphoryl chloride useful for commercial production of pesticides and pharmaceutically active compounds.

BACKGROUND OF THE INVENTION

Phosphoramidothioates are known for their excellent insecticidal activity against a variety of insects in various environments. Acephate, a systemic insecticide, is one of widely used phosphoramidothioate that controls a wide range of chewing and sucking insects, e.g. aphids, thrips, lepidopterous larvae, sawflies, leaf miners, leafhoppers, cutworms, etc., in fruit (including citrus), vines, hops, olives, cotton, soya beans, peanuts, macadamia nuts, beet, brassicas, celery, beans, potatoes, rice, tobacco, ornamentals, forestry, and other crops.

Thiophosporyl chloride is a useful starting material for synthesis of organo-phosphorus compounds in agrochemical industry.

German Patent 1145589 discloses that thiophosphoryl chloride is obtained by treating phosphorous trichloride and sulfur in liquid phase at atmospheric pressure, using aluminum or alloys thereof, either neat or with halogens. Similar process is disclosed in patents (U.S. Pat. Nos. 2,715,561, 2,850,354, 2,850,354) using metal halides as catalyst.

U.S. Pat. No. 5,464,600 discloses a process for preparing thiophosphoryl chloride by reacting phosphorous trichloride with sulfur in the presence of tertiary amine catalyst. The improvement in the process is use of tertiary amine (aromatic and aliphatic) as catalyst. The tertiary amine is selected from the group consisting of 5-ethyl-2-methylpyridine, 2-methylpyridine, 2,4-dimethylpyridine, 2,6-dimethylpyridine, 2,4,6-trimethylpyridine, tri-n-propylamine, tri-n-butylamine, tris-[2-(2-methoxyethoxy)ethyl]amine and 1,8-diazabicyclo[5.4.0]undec-7-ene. As described in examples the reaction mixture was cooked for 9 hours (via 5-ethyl-2-methylpyridine) or for 14 hours (via 2,6-Lutidine) or for 3 hour 44 min (via Tributylamine) or for 19 hours and 17 min (via N,N-Dimethylaniline) or for 15 hour 6 min via 1,8-Diazabicyclo[5.4.0.]undec-7-ene (DBU).

U.S. Pat. No. 6,251,350 disclose process for preparing thiophosphoryl chloride by reacting phosphorous trichloride with sulfur in the presence of a catalytic amount of a tertiary amine, and essentially in the presence of a catalytic amount of a nitroxide free radical. The nitroso free radical is 2,2,6,6-tetramethyl-1-piperidinyloxy ("TEMPO"). Example 1 of this patent disclose reaction in presence of tertiary amine and TEMPO performed for about 2 hours and 8 minutes to produce thiophosphoryl chloride.

Activated charcoal is commonly used as solid phase catalyst to promote the thiolation reaction and observed to give quantitative conversion. However, while use, this catalyst process is associated with many issues at commercial production. Catalyst, while product isolation by distillation, is carried over with product yielding poor product appearance such as blackening of the product. Other practical issues such as foaming issues in the reactor pot/HEEL and flooding in the column with solid catalyst; catalyst depletion; etc are immediate to list. The disadvantages continue with post sufficient recycles, removal and disposal of this highly corrosive two-phase highly viscous slurry mass of HEEL and retained catalyst is often a major effluent concern to dispose as well as a safety hazard. Thus, this process is not industrially viable and amenable for scale-up.

Thus, there exists a need to develop a simple, cost-effective, rapid and commercially viable process for the commercial scale preparation of thiophosphoryl chloride used as an intermediate for preparation of organo-phosphorus compounds in agrochemical industry. The present invention thus provides an industrially viable and cost-effective process for the large scale preparation of acephate and its intermediate thiophosphoryl chloride.

SUMMARY OF THE INVENTION

In an aspect the present invention provides a commercial and rapid process for preparation of thiophosphoryl chloride.

In another aspect the present invention provides continuous process for preparation of thiophosphoryl chloride with high yield and high purity.

In another aspect the present invention provides a simple and less time consuming commercial process for preparation of acephate using thiophosphoryl chloride prepared according to the present invention.

In another aspect the present invention provides a commercial process for preparation of an intermediate thiophosphoryl chloride which is used for preparation of acephate.

In another aspect the present invention provides a continuous process for preparation of acephate.

Aspects, advantageous features and preferred embodiments of the present invention summarized as follows, respectively alone or in combination, contribute to solving this and other objects of the invention.

DETAILED DESCRIPTION OF THE INVENTION

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Accordingly, Applicants co-pending Indian patent application 202021004454 titled "A continuous flow process for preparation of Acephate and its intermediates" is herein incorporated in its entirety by reference into the specification, to the same extent as if publication, patent or patent application was specifically indicated to be incorporated herein by reference. The contents of this patent application and its publication is incorporated herein by reference.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

Surprisingly, it was found that process for preparation of thiophosphoryl chloride improved in a way as disclosed herein which provides a scalable method that can safely be handled on a larger scale with reproducible yields and more efficiently better-quality products, at a lower cost.

The present invention provides an efficient; effective and safe process for preparation of thiophosphoryl chloride as described herein.

In an aspect the present invention provides a process for preparation of thiophosphoryl chloride comprising reaction of phosphorus trichloride and sulfur in thiophosphoryl chloride in the presence catalytic amount of a base.

In an embodiment the process comprises reaction of phosphorus trichloride and sulfur in thiophosphoryl chloride in the presence of a base, the reaction being carried out at a temperature in range of 100-150° C.

In an embodiment, the present process is balanced and enough to ensure quick conversion into desired product resulting into low cook time.

It has been surprisingly found that the reaction time can be substantially and significantly reduced if the reaction is carried out in thiophosphoryl chloride in the presence of a base. Without wishing to be bound by theory, the present inventors believe that the starting thiophosphoryl chloride acts as a self-solvent for the reaction components to be brought together, which in the presence of a catalytic base, therefore accelerates the reaction and significantly reduces the reaction time.

Accordingly, the present invention relates to a process for the preparation of thiophosphoryl chloride comprising reacting phosphorus trichloride with sulfur, in thiophosphoryl chloride, in the presence a base.

In an embodiment the reaction of phosphorus trichloride and sulfur in thiophosphoryl chloride in presence of a catalytic base is carried out within a period of less than 60 min.

In an embodiment the reaction is cooked for a period of 20 to 60 minutes to obtain thiophosphoryl chloride.

In an embodiment the reaction of phosphorus trichloride and sulfur in thiophosphoryl chloride in the presence of a base is carried out for a period of 20 minutes.

In an embodiment the reaction of phosphorus trichloride and sulfur in thiophosphoryl chloride in the presence of a base is carried out for a period of 30 minutes.

In an embodiment the reaction of phosphorus trichloride and sulfur in thiophosphoryl chloride in the presence of a base is carried out for a period of 40 minutes.

In an embodiment the reaction of phosphorus trichloride and sulfur in thiophosphoryl chloride in the presence of a base is carried out for a period of 60 minutes.

In an embodiment the catalyst is alkyl amine, preferably trialkyl amine.

In an embodiment the catalyst is tributylamine.

In an embodiment, the catalyst is used in an amount in the range of 0.01-0.08 mole fraction of Phosphorus trichloride for first charge.

In an embodiment, the molar ratio of phosphorus trichloride and sulfur is about 1:1.

In an embodiment the reaction of phosphorus trichloride and sulfur in thiophosphoryl chloride in the presence of a base is carried out at a temperature in range of 100-150° C.

In an embodiment the reaction of phosphorus trichloride and sulfur in thiophosphoryl chloride in the presence of a base is carried out at a temperature in range of 110-130° C.

In an embodiment the reaction of phosphorus trichloride and sulfur in thiophosphoryl chloride in the presence of a base is carried out at atmospheric pressure.

In an embodiment, the phosphorus trichloride and sulfur are reacted in equivalent ratio.

In an embodiment, the reaction of Phosphorus trichloride and sulphur is carried out in presence of catalytic amount of base and thiophosphoryl chloride for a period of less than 60 minutes to obtain desired product.

According to the present invention, the reaction schematic showing method for synthesizing thiophosphoryl chloride is represented as follows.

Scheme 1

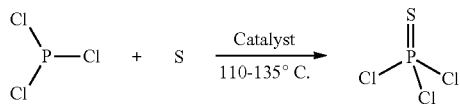

In an embodiment the catalyst is a base. The base is trialkylamine.

In an embodiment, the base is tributylamine and is used in an amount in the range of 0.01-0.08 mole fraction of phosphorus trichloride.

In an embodiment the desired product is PSCl3 and is obtained in high yield and high purity.

According to the present invention the product yield stabilizes between 93-95% post 5-7 recycles of heel.

Accordingly, the product PSCl₃ obtained according to the present invention has purity more than 95%.

The product PSCl₃ obtained according to the present invention has purity at least 98%.

The product PSCl₃ obtained according to the present invention has purity at least 99%.

In an embodiment, the process further comprises distilling out thiophosphoryl chloride (PSCl₃) from the reaction mixture leaving behind un-distilled residue termed as "HEEL" which is recycled back for subsequent batches. Typically, the heel is a un-distilled residue/fluid comprising thiophosphoryl chloride and catalyst.

In an embodiment, the process comprising distilling pure thiophosphoryl chloride from the reaction mixture leaving behind the distillation heel.

In an embodiment, the process further comprising recycling the distillation heel to a subsequent batch.

In an embodiment, the present process is operated in at least for 20-50 cycles.

In an embodiment, the present process is operated for more than 50 cycles

In an embodiment, the present process is operated in about 20-30 cycles.

In an embodiment, the process may be practised in either batch or semi-continuous mode of operation.

In an embodiment, the process further comprises continuous recycling of the distillation heel to the reaction stage of the phosphorous trichloride and sulfur to produce thiophosphoryl chloride.

In accordance with the invention, the process is highly suitable to either a batch or continuous reaction. In the continuous reaction, the distillation heel is recycled continuously to a primary reactor stage, where the sulfur and phosphorous trichloride are reacted and can be continued effectively for about 20 to 50 cycles and more.

Typically, Phosphorus trichloride is treated with sulfur in solvent comprising of-thiophosphoryl chloride or un-distilled residue HEEL in the distillation pot; retaining the catalyst. After completion of the reaction the mixture is subjected to distillation thereby separating the product in high yield and purity.

Typically, the reaction mixture is distilled and two streams (distillate-1 for recycle to heel and distillate-2 containing thiophosphoryl chloride) as product are collected. The distillate-1 obtained during distillation of reaction mass containing majorly thiophosphoryl chloride is about 95-98%, which is used as reaction moderator for the continuous production of acephate.

The system is balanced and sufficient enough to have boiling range of four component reaction mixture high to ensure quick conversion resulting to low cook time.

Advantages of the Process According to Present Invention i) Single phase reaction throughout the process.
ii) No foaming observed in the reaction mass during reaction or work-up.
iii) Low vapor temperature during Thiophosphoryl chloride recovery.
iv) Easy and safe dispose of HEEL commercially after sufficient recycles.
v) The product quality is more than 98% as colorless liquid (zero foreign contamination).
vi) High product yield between 93-95% post 5-7 recycles of HEEL.
vii) Catalyst retained in the HEEL is available for subsequent recycle batches. Its make-up charge can be required only after 50 cycles. Catalyst depletion by prominent noted by rise in cook time for reaction completion.
viii) Semi-continuous manufacturing system by flipping between fresh charges of Phosphorus trichloride; Sulfur and catalyst (as required) to HEEL under nitrogen blanketing; giving cook time (30-60 min) & distilling two streams (Distillate-1 for recycle to HEEL & Thiophosphory Chloride as product).
ix) Post sufficient recycles (>50), HEEL observed easy to unload into drums for dispose. Finally, for its disposal, it may be treated with Aq. caustic solution & scrubbing the off gases.
x) The improvement comprises use of high boiler reaction media along with liquid phase base amine as catalyst resulting in high quality, high yield product, operational ease, high throughput, industrial hygiene & safety and easy to unload & dispose residue after sufficient recycles.
xi) The use of adjunct catalysts such as TEMPO is avoided in order to avert hazardous free radical side-reactions.
xii) The reaction time to completion is significantly reduced.

In another aspect the present invention provides a process for the manufacture of the insecticide, namely acephate (N-(Methoxy-methylsulfanylphosphoryl) acetamide) and its intermediates.

In an embodiment, the present invention provides a process for preparation of acephate comprising reaction of phosphorus trichloride and sulfur in thiophosphoryl chloride in the presence a base to obtain thiophosphoryl chloride.

In an embodiment the present invention provides a process for preparation of acephate comprises:
1) preparing thiophosphoryl chloride by reacting phosphorus trichloride and sulfur in thiophosphoryl chloride in the presence catalytic amount of a base;
2) preparing O-methyl phosphorodichloridothioate (monoester) using the thiophosphoryl chloride of step (1);
3) preparing O,O-dimethyl phosphorochloridothioate (diester) using the monoester of step (2);
4) preparing O,O-dimethylphosphoramidothioate (DMPAT) using the diester of step (3); and
5) preparing acephate using the DMPAT of step (4).

The process as described in step 4) comprises treating DMPAT with catalytic alkyl sulfate for example dimethyl sulphate to form methamidophos, and the methamidophos formed is subjected to acetylation reaction using acetic anhydride to form N-(methoxy-methylsulfanylphosphoryl) acetamide.

Accordingly, in an embodiment the process for preparation of acephate comprises reaction of phosphorus trichloride and sulfur in thiophosphoryl chloride in the presence of tributyl amine catalyst to obtain thiophosphoryl chloride in high yield and purity.

In an embodiment, the reaction of phosphorus trichloride and sulfur in thiophosphoryl chloride is carried out at a temperature in range of 100-150° C.

In an embodiment the process for preparation of acephate is characterized in that reaction of phosphorus trichlorideand sulfur in thiophosphoryl chloride is carried out in presence of tributyl amine catalyst at temperature in the range of 120-150° C. for about less than 60 minutes to obtain thiophosphoryl chloride in high yield and purity.

According to the present invention the reaction schematic showing method for synthesizing acephate is represented as follows.

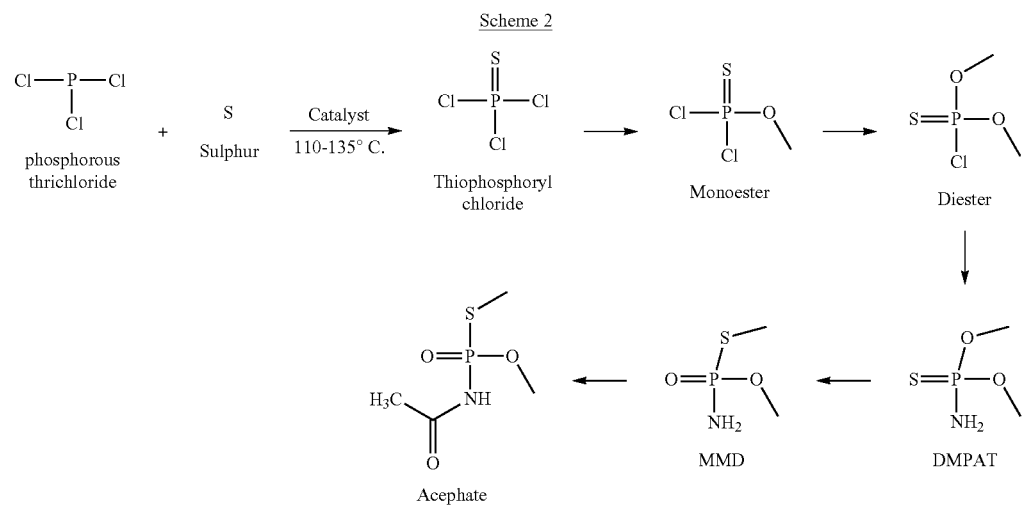

Scheme 2

In an aspect the present invention provides a process for preparation of acephate comprising
a) Preparing thiophosphoryl chloride and
b) Converting thiophosphoryl chloride to acephate In an embodiment the step a) comprises treating phosphorus trichloride, thiophosphoryl chloride and sulfur in presence of tributyl amine catalyst to obtain thiophosphoryl chloride.

In an embodiment the process further comprising distilling pure thiophosphoryl chloride from the reaction mixture leaving behind the distillation heel.

In an embodiment the process further comprising recycling the distillation heel to a subsequent reaction stage of the phosphorous trichloride and sulfur to produce thiophosphoryl chloride.

In an embodiment, the conversion in step b) comprises at least one step selected from
(i) treating thiophosphoryl chloride with methanol to obtain O-methyl phosphorodichloridothioate,
(ii) treating O-methyl phosphorodichloridothioate with methanol to obtain O,O-dimethyl phosphorochloridothioate; or
(iii) treating O,O-dimethyl phosphorochloridothioate with base to obtain O,O-dimethyl phosphoramidothioate.

In an embodiment the process further comprises acetylating O,O-dimethyl phosphoramidothioate in presence of acetic anhydride to obtain acephate.

In an embodiment the process for preparation of acephate comprises:
a) reacting phosphorus trichlorideand sulfur in thiophosphoryl chloride in the presence of tributyl amine catalyst to obtain thiophosphoryl chloride; and
b) using the thiophosphoryl chloride prepared in step (a) to prepare acephate.

In an embodiment the process for preparation of acephate comprises:
a) reacting phosphorus trichloride and sulfur in thiophosphoryl chloride in the presence of tributyl amine catalyst to obtain thiophosphoryl chloride; and
b) reacting thiophosphoryl chloride with methanol to prepare O-methyl phosphorodichlorodithioate (monoester); and
c) using the O-methyl phosphorodichlorodithioate (monoester) prepared in step (b) to prepare acephate.

In an embodiment, thiophosphoryl chloride is reacted with methanol in a continuous mode.

In an embodiment, thiophosphoryl chloride is reacted with methanol in a batch mode.

In an embodiment, other alcohols instead of methanol, preferably a lower alcohol, may also be used.

In an embodiment the process for preparation of acephate comprises:
a) reacting phosphorus trichloride and sulfur in thiophosphoryl chloride in the presence of tributyl amine catalyst to obtain thiophosphoryl chloride; and
b) reacting thiophosphoryl chloride with methanol to prepare O-methyl phosphorodichlorodithioate (monoester); and
c) reacting the O-methyl phosphorodichlorodithioate (monoester) with methanol to prepare O,O-dimethyl phosphorochlorodithioate; and
d) using the O,O-dimethyl phosphorochlorodithioate prepared in step (c) to prepare acephate.

In an embodiment, the step of reacting O-methyl phosphorodichlorodithioate (monoester) with methanol to prepare O,O-dimethyl phosphorochlorodithioate is carried out for 1 to 5 hours, preferably 2 to 3 hours.

In an embodiment the process for preparation of acephate comprises:
a) reacting phosphorus trichloride and sulfur in thiophosphoryl chloride in the presence of tributyl amine catalyst to obtain thiophosphoryl chloride; and
b) reacting thiophosphoryl chloride with methanol to prepare 0-methyl phosphorodichlorodithioate (monoester); and
c) reacting the O-methyl phosphorodichlorodithioate (monoester) with methanol to prepare O,O-dimethyl phosphorochlorodithioate (diester);
d) reacting the diester with ammonium hydroxide and sodium hydroxide to produce the DMPAT (O,O-dimethylphosphoramidothioate); and
e) using the DMPAT produced in step (d) to prepared acephate.

In an embodiment, the DMPAT is subjected to an acetylation reaction to prepare acephate.

In an embodiment the process for preparation of acephate comprises:
a) reacting phosphorus trichloride and sulfur in thiophosphoryl chloride in the presence of tributyl amine catalyst to obtain thiophosphoryl chloride; and
b) reacting thiophosphoryl chloride with methanol to prepare O-methyl phosphorodichlorodithioate (monoester); and
c) reacting the O-methyl phosphorodichlorodithioate (monoester) with methanol to prepare O,O-dimethyl phosphorochlorodithioate (diester);
d) reacting the diester with ammonium hydroxide and sodium hydroxide to produce the DMPAT (O,O-dimethylphosphoramidothioate); and
e) subjecting DMPAT to isomerisation using alkyl sulphate followed by acetylation reaction to prepare acephate.

The reaction products obtained in above steps are isolated or separated from the reaction or carried forward without additional processing by the techniques known to a skilled person. Thus, the compounds described herein can be recovered from reaction mixtures and purified in a conventional manner.

The process as described above where the reaction may proceeds by isolating each step product or without isolating each step product and proceed as continuous process.

In an embodiment, the process for preparation of acephate comprises treatment of phosphorus trichloride and sulfur in thiophosphoryl chloride in presence of tributyl amine catalyst to obtain thiophosphoryl chloride and further converting into acephate.

The process according to the present invention provides thiophosphoryl chloride with purity at least 95%, preferably at least 99%.

In an embodiment, the present invention provides the conversion of thiophosphoryl chloride, as described herein, into acephate, as described herein, according to steps of described method. In an embodiment, the conversion of thiophosphoryl chloride to acephate comprises the following steps Step 1: Preparation of thiophosphoryl chloride.

Step 2: Preparation of O-methyl phosphorodichloridothioate (monoester).

Step 3: Preparation of O,O-dimethyl phosphorochloridothioate (diester).

Step 4: Preparation of O,O-dimethylphosphoramidothioate (DMPAT); and

Step 5: Preparation of acephate.

The sequence of steps outlined above can be integrated into an overall scheme for the production of acephate. Such an integrated process is generally comprised of the following steps under suitable reaction conditions described herein:

Step 1: The first step is formation of thiophosphoryl chloride by treating phosphorus trichlorideand sulfur in thiophosphoryl chloride in presence of alkyl amine for example tributyl amine catalyst.

In an embodiment, the reaction is carried out for about 60 minutes, preferably 30 to 40 minutes at temperature in the range of from 100-150 degrees.

In an embodiment, the alkyl amines such as triethyl amine, n-propyl amine, tri n-butyl amine, diisopropyl ethyl amine can also be used.

Step 2: In this step O-methyl phosphorodichloridothioate is prepared by treating thiophosphoryl chloride with methanol at low temperature between −10 to 0° C. for about 1 to 5 hours.

Step 3: In this step O-methyl phosphorodichloridothioate is treated with methanol in presence of base at temperature between −10 to 0° C. for about 1 to 5 hours to obtain O,O-dimethyl phosphorochloridothioate (diester).

The base is selected from group comprising of lithium hydroxide, sodium hydroxide, potassium hydroxide, sodium carbonate, potassium carbonate, sodium bicarbonate, potassium bicarbonate, or mixture thereof.

Step 4: In this step O,O-dimethyl phosphorochloridothioate (diester) obtained in step 3 is treated with ammonium hydroxide to get DMPAT. The reaction is preferably carried out at temperature in the range of 20-30° C. for 1 to 3 hours in presence of base and the base is selected from group comprising of lithium hydroxide, sodium hydroxide, potassium hydroxide, sodium carbonate, potassium carbonate, sodium bicarbonate, potassium bicarbonate, or mixture thereof. DMPAT thus obtained is isolated from the mixture by extracting with suitable solvent such as methylene chloride.

Step 5: In this step DMPAT is isomerised using alkyl sulphate for example dimethyl sulphate to form methamidophos. The reaction is performed in suitable solvent for example methylene dichloride at temperature in the range of 30-50° C. for 2-5 hours. The reaction mixture containing methamidophos in solvent is used as such for converting into acephate by acetylation. The acetylation reaction is carried out using acetic anhydride and suitable acid for example sulphuric acid to obtain desired product acephate in high yield and high purity. The acetylation is carried out at temperature in the range of 30-50° C. for 2-5 hours. The final product acephate thus obtained can be crystallized using suitable solvent for example ethyl acetate or methylene dichloride.

Advantageously, the process for preparation of acephate comprising treating phosphorus trichlorideand sulfur in thiophosphoryl chloride in the presence of tributyl amine catalyst to obtain thiophosphoryl chloride in less than 60 minutes and further converting into acephate by the processes as described herein or in a conventional manner understood by those skilled in the art.

The process scheme of the present invention advantageously increases yields and purity of the final product.

The overall scheme for the production of acephate according to the present invention is rapid, simple, cheap, robust, fast e.g., short cycle times and commercially and industrially viable.

The invention will now be described in more details with reference to the following examples and they should not be considered as limiting the scope of the disclosure in any way, as these examples and other counterparts thereof will become apparent to those skilled in the art in the light of the present disclosure. The skilled person will appreciate that the general synthetic routes detailed above show common reactions to transform the starting materials as required. The specific reactions that are not provided are known to the skilled person and such reactions are well known to those skilled in the art and appropriate conditions considered to be within the skilled person's common general knowledge.

EXAMPLES

Example 1

Preparation of Thiophosphoryl Chloride According to the Present Invention

In a 1L four necked round bottom flask with overhead stirrer, reaction mass temperature sensor, oil bath with temperature sensor; vapor temperature; condenser cooled to 0° C., nitrogen blanket, adaptor and collection flask and 5-10% caustic scrubber for quenching off-gases was charged with sulfur (2.53 mole, 81 g); and thiophosphoryl chloride (450 g). Tributyl amine (5 g) was then charged into the flask. The reaction mixture was gradually heated to reflux under continuous agitation. Phosphoryl trichloride (2.54 mole, 350 g) was added dropwise into this mixture. The reaction was monitored by mass temperature sensor; allowed gradually to attained constant temperature of 130° C. and cooked for about 1 h post attaining steady mass temperature of 130° C. Post confirmation of conversion >95% of phosphorus trichloride, the reaction mixture was subjected to atmospheric distillation. The first cut (distillate-1, Forecut ~5% of reaction mass; 45-50 g) of phosphoryl trichloride was collected and then the main product stream of thiophosphoryl chloride (400-405 g) was collected as distillate-2 with purity >98%. The residue (heel, 430 g) remained in the bottom of reactor is used for subsequent recycle batches.

In the subsequent recycle batch, distillate-1 from above batch is admixed with heel in the reaction flask as solvent/reaction moderator and charging sulfur and phosphorus trichloride in the same manner as above to initiate the reaction. The reaction mass was cooked for 1 h post addition at 130° C.; monitored by GC for reaction completion and distilled.

The reaction experimental details are represented in below table 1.

TABLE 1

| Batch # | Moderator/reaction media PSCl$_3$ (g/mol) | Moderator/reaction media HEEL + Distillate-1 (g) | Sulfur, g/mol | PCl$_3$, g/mol | Cook time (h) | Distillat-1 (g) | Yield (%) |
|---|---|---|---|---|---|---|---|
| Heel formation | 450/2.65 | — | 81/2.53 | 350/2.54 | 1 | 50 | 92.7 |
| Recycle-1 | — | 430 + 50 | 81/2.53 | 350/2.54 | 1 | 46 | 94.7 |
| Recycle-2 | — | 430 + 46 | 81/2.53 | 350/2.54 | 1 | 45 | 97.3 |

Table 2 shows results of the reactions.

| PSCl$_3$ Cut-1 & Cut-2 Composition | | |
|---|---|---|
| Parameters | % Unreacted PCl$_3$ | % of PSCl$_3$ |
| Distillate-1 | <2.0% | 95-99% |
| Distillate-2 (Product) | <0.5% | 98-99.5% |

Example 2

In a 1 litre four-neck Kettle fitted with addition funnel, TP, reflux divider and condenser, Thiophosphoryl chloride (430 g), tributylamine (9 g, 0.048 mole) and sulfur (90 g, 2.81 mole) were charged and the reaction mass was gradually raised to 120° C. Phosphorus chloride (350 g, 2.55 mole) was added at reflux condition and further cooked at this temperature for 30 minutes. The reaction progress was monitored by GC chromatograph. The reaction mass was then subjected to atmospheric distillation. The unreacted phosphorus chloride was distilled in 1$^{st}$ fraction and the product thiophosphoryl chloride was distilled in the second fraction at the temperature range of 120-125° C. The Heel residue containing thiophosphoryl and tributylamine remained in the mixture was used as such for next recycle reaction as provided in example 1. The distilled product was analysed as thiophosphoryl chloride (429.5 g, 99.6%).

Example 3

Under a similar procedure to that described in Example 2 except that the product thiophosphoryl chloride is distilled directly by increasing cooking time by 30 minutes and avoided the first distillate to obtain thiophosphoryl chloride (429.4 g, 99.5%).

Example 4

Thiophosphoryl chloride (6330 Kg) and tributylamine (300 kg) were charged into the reactor and the temperature of reaction mass was gradually raised to 120° C. Molten sulfur (2083 kg) and phosphorus chloride (8495 Kg) were added at reflux condition into the reactor and further cooked at this temperature for 40 minutes. The reaction progress was monitored by GC chromatograph. The reaction mass was then subjected to atmospheric distillation. The unreacted phosphorus chloride was distilled in 1$^{st}$ fraction and the product thiophosphoryl chloride (10469 Kg, 99.7%) was collected in the second fraction at the temperature range of 120-127° C. The Heel residue containing thiophosphoryl and tributylamine remained in the reactor was kept as such for recycle batch reaction.

Example 5

Under a similar procedure to that described in Example 5 except that the product thiophosphoryl chloride is distilled directly by increasing cooking time to 90 minutes and avoided the first distillate to obtain thiophosphoryl chloride (10470 kg, 99.5%).

Example 6

In a one Ltr four-neck Kettle fitted with addition funnel, reflux divider and condenser, Thiophosphoryl chloride (430 g), tributylamine (9 g, 0.048 mole) and Sulfur (90 g, 2.81 mole) were charged and the reaction mass was gradually raised to 120° C. in 30 minutes. 350 g (2.55 mole) phosphorus chloride at reflux condition and further cooked at this temperature for 45 minutes. The reaction progress was monitored by GC chromatograph. The reaction mass was then subjected to atmospheric distillation. The unreacted phosphorus chloride was distilled in 1st cut and the product was distilled at the temperature range of 120-125° C. to get thiophosphoryl chloride (429.5 g, 99.6%). The Heel residue containing thiophosphoryl and tributylamine was kept as such for recycling.

Example 7

Comparative Example 1

Synthesis of Thiophosphoryl Chloride

Thiophosphoryl chloride (430 g) was added as a heel to a 1 Ltr four neck Kettle fitted with addition funnel, TP, Reflux divider and condenser. Activated carbon (10.5 g) and Sulfur (90 g, 2.81 mole) was charged into the kettle and the reaction mass was gradually raised to 120° C. Phosphorus chloride (350 g, 2.55 mole) was added at reflux condition and further cooked at this temperature for 60 minutes. The reaction progress was monitored by GC chromatograph. The reaction mass was then subjected to atmospheric distillation. The unreacted Phosphorus chloride was distilled in $1^{st}$ fraction and the product was distilled at the temperature range of 120-125° C. in the second fraction to obtain thiophosphoryl chloride. Thiophosphoryl chloride obtained with black colour. Also foaming during PCl3 addition and distillation of product was observed.

Comparative Example 2

Synthesis of Thiophosphoryl Chloride

To a 1 Ltr four neck Kettle fitted with addition funnel, TP, Reflux divider and condenser etc. 350 g (2.55 mole) phosphorus chloride and Sulfur (90 g, 2.81 mole) was charged. Added Tributylamine (9 g, 0.048 mole) resulting slight exotherm and reaction mass was gradually raised to 120° C. in 90 minutes and further cooked at this temperature for 240 minutes to complete the reaction. The reaction progress was monitored by GC chromatograph. The reaction mass was subjected to atmospheric distillation. The unreacted Phosphorus chloride was distilled in 1st cut, in main cut product thiophosphoryl chloride was distilled at the temperature range of 120-125° C. to obtain thiophosphoryl chloride (429 g). xii). It was observed that the reaction time is significantly higher and thus commercially not viable.

Example 8

Industrial Process for Preparation of Acephate According to Present Invention

Step 1—Thiophoshporyl Chloride Preparation:
Thiophosphoryl chloride ($6.33 \times 10^3$ Kg) was charged into the reactor. Tributylamine ($0.3 \times 10^3$ Kg) was added into the reactor and the reaction mass was gradually raised to 120° C. Molten Sulfur ($2.083 \times 10^3$ Kg) was then added into the reactor and phosphorus chloride ($8.495 \times 10^3$ Kg) addition was started at reflux condition. The mixture was cooked at this temperature for 60 minutes. After completion of reaction, the reaction mass was subjected to atmospheric distillation. The unreacted phosphorus chloride was distilled in 1st cut and thiophosphoryl chloride ($10.47 \times 10^3$ Kg) was collected as distillate-2 (99.7%) at the temperature range of 120-127° C. and used in next step for the preparation of o-methyl dichlorothiophosphate in a continuous process. The Heel residue containing thiophosphoryl and tributylamine was used as such for recycle batch.

Step 2—O-Methyl Dichlorothiophosphate Preparation:
A continuous stirred tank reactors (CSTR) was charged with thiophosphoryl chloride (flow rate of $1.309 \times 10^3$ Kg/h) from step 1) and methanol (flow rate of $1.129 \times 10^3$ Kg/h) at temperature $-5 \pm 3°$ C. maintaining the residence time of the reaction 3 hour. After completion the reaction mass was quenched over chilled water, separated the product and stored to use in next step for the preparation of O,O-dimethyl chlorothiophosphate.

Step 3—O,O-dimethyl chlorothiophosphate Preparation:
Methanol ($2.85 \times 10^3$ Kg) was charged into the CSTR and O-methyl dichlorothiophosphate ($4.482 \times 10^3$ Kg) obtained in step 2 was added to reactor at temperature $-10°$ C. Sodium hydroxide solution (32% solution, 3.75×103 Kg) was added to the mixture by maintaining the temperature $-5 \pm 3°$ C. After completion, the reaction mass was diluted with water, separated the product and used in next step for the preparation of O,O-dimethyl phosphoramidothioate.

Step 4—O,O-Dimethyl Phosphoramidothioate Preparation:
CSTR was charged with O,O-dimethyl chlorothiophosphate obtained in step 3) (flow rate of $1.058 \times 10^3$ Kg/hr) and addition of a premix (flow rate of $1.821 \times 10^3$ Kg/h: premix is 766×103 Kg/h, 32% caustic and $1.055 \times 10^3$ Kg/h Aq. ammonia solution (17%)) at $23 \pm 2°$ C. was continued for residence time of 1.5 hrs. The reaction progress was monitored by GC chromatograph. After completion the reaction mass was extracted with dichloromethane to recover O,O-dimethyl phosphoramidothioate (825 kg/h) and used in the next step.

Step 5 Preparation of Acephate
O,O-dimethyl phosphoramidothioate ($4.54 \times 10^3$ Kg) obtained in step 4) above was taken in methylene dichloride ($3.17 \times 10^3$ Kg) for isomerisation and treated with dimethyl sulfate ($0.546 \times 10^3$ Kg) in two lots to the solution at 35-49° C. and the reaction mass was cooked for 4 hours at 45-48° C. to form O,S-dimethyl phosphoramidothioate. The isomerized product was then transferred into another reactor for acetylation.

A precooled mixture of acetic anhydride ($3.103 \times 10^3$ Kg) and sulphuric acid ($0.094 \times 10^3$ Kg) was then added in the reaction mixture at 35-45° C. over a period of 1.5 Hrs and continued cooking for 1 hr at same temperature. The obtained mass was neutralised using liquid ammonia and the product was extracted with dichloromethane to obtain desired product acephate ($4.826 \times 10^3$ kg) as a white solid with 98% purity.

The invention claimed is:

1. A process for preparing of thiophosphoryl chloride comprising reacting phosphorus trichloride with sulfur, in thiophosphoryl chloride, in the presence a base, wherein said reacting is carried out within a period of less than 60 minutes and said process is recycled for 5 to 7 cycles.

2. The process as claimed in claim 1 wherein said base is a trialkylamine.

3. The process as claimed in claim 2 wherein said trialkylamine base is tributylamine.

4. The process as claimed in claim 2 wherein said base is in an amount in the range of 0.01-0.08 per mole fraction of phosphorus trichloride.

5. The process as claimed in claim 1 wherein a molar ratio of phosphorus trichloride and sulfur is about 1:1.

6. The process as claimed in claim 1 wherein said reaction is carried out at a temperature in range of 100-150° C.

7. The process as claimed in claim 1 wherein said reaction is carried out at normal atmospheric pressure.

8. The process as claimed in claim 1 further comprising distilling pure thiophosphoryl chloride from the reaction mixture leaving behind a distillation heel.

9. The process as claimed in claim 8 further comprising recycling the distillation heel to a subsequent reaction stage of the phosphorous trichloride and sulfur to produce the thiophosphoryl chloride.

10. The process as claimed in claim 9 wherein said recycling after a first stage is operated for more than 50 cycles to produce pure thiophosphoryl chloride.

11. The process as claimed in claim 10 wherein said reacting is carried out at a temperature in range of 100-150° C.

12. A process for preparing acephate comprising
a) preparing thiophosphoryl chloride, and
b) converting the thiophosphoryl chloride to acephate,
wherein said step a) comprises treating phosphorus trichloride, thiophosphoryl chloride and sulfur in the presence of a tributyl amine catalyst to obtain the thiophosphoryl chloride for a period of less than 60 minutes.

13. The process as claimed in claim 11 wherein the base is.

14. The process as claimed in claim 12 further comprising distilling pure thiophosphoryl chloride from the reaction mixture leaving behind a distillation heel.

15. The process as claimed in claim 14 further comprising recycling the distillation heel to a subsequent reaction stage of the phosphorous trichloride and sulfur to produce the thiophosphoryl chloride.

16. The process as claimed in claim 12, wherein said conversion in step b) comprises at least one step selected from
  (i) treating thiophosphoryl chloride with methanol to obtain O-methyl phosphorodichloridothioate,
  (ii) treating O-methyl phosphorodichloridothioate with methanol to obtain O,O-dimethyl phosphorochloridothioate; or
  (iii) treating O,O-dimethyl phosphorochloridothioate with base to obtain O,O-dimethyl phosphoramidothioate.

17. The process as claimed in claim 16 further comprises acetylating O,O-dimethyl phosphoramidothioate in presence of acetic anhydride to obtain acephate.

18. The process as claimed in claim 12, wherein reacting proceeds by isolating each step product, without isolating each step product, or as continuous process.

19. The process as claimed in claim 1 wherein thiophosphoryl chloride is obtained with a purity of at least 95%.

* * * * *